US006862284B1

(12) United States Patent
Spiegel et al.

(10) Patent No.: US 6,862,284 B1
(45) Date of Patent: *Mar. 1, 2005

(54) FORMAT FOR AUTOMATIC GENERATION OF UNIQUE ATM ADDRESSES USED FOR PNNI

(75) Inventors: Ethan Spiegel, Mountain View, CA (US); Ashok Chippa, San Jose, CA (US); Marek Tomaszewski, Fremont, CA (US); Anthony Alles, Sunnyvale, CA (US)

(73) Assignee: Cisco Technology, Inc., San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/876,952

(22) Filed: Jun. 17, 1997

(51) Int. Cl.$^7$ ................................................ H04L 12/28
(52) U.S. Cl. .............................. 370/395.1; 370/395.54; 370/408
(58) Field of Search ................................ 370/389, 395, 370/396, 397, 400, 401, 473, 474, 395.1, 395.5, 395.54, 408; 395/829, 830; 709/220, 245, 223

(56) References Cited

U.S. PATENT DOCUMENTS 4,827,411 A    5/1989  Arrowood et al.
4,965,767 A *  10/1990 Kinoshita et al.
4,965,772 A    10/1990 Daniel et al.

(List continued on next page.)

OTHER PUBLICATIONS

Updated Applicants' Statement on p. 2 of the attached Information Disclosure Statement.
Bill Mayo, "Patent Declaration," The ATM Forum, http://www.atmforum.com/standards/113.html (2002).
Applicants' Statement on p. 2, of the attached Information Disclosure Statement.
ATM Forum User–Network Interface Specification (v.3.1) Table of Contents vii–xxv & pp. 159–164.
ATM Forum Private Network–Network Interface Specification (1.0) www.ATMForum.com, 385 pgs.
William Stallings, Data and Computer Communications, PP: 329–333, Prentice Hall, Upper Saddle River, New Jersey 07458.

Primary Examiner—Frank Duong
(74) Attorney, Agent, or Firm—Blakely, Sokoloff, Taylor & Zafman LLP

(57) ABSTRACT

The invention provides a method and system for providing unique ATM End System Addresses, in which each new device is assigned a unique address in an ATM network while allowing all new devices performing the PNNI protocol in a selected set (such as all those from a single manufacturer) to be assigned by default to the same peer group. In the invention, a first portion of the ATM address (from which the default peer group ID is determined) is by default configured to equal a selected value unique to the manufacturer (or another selected class of devices), which assures that all devices from the same manufacturer (or in that selected class) are by default configured in the same peer group for PNNI protocol purposes, while a second portion of the ATM address (comprising a switch number ID) and a third portion of the ATM address (comprising a device number ID) are by default both configured to equal a unique value for the device (such as a MAC address), which assures that each device is configured with a unique ATM address. The third portion of the ATM address may alternatively be determined using a different method, so long as selection of the third portion causes each device to be assigned a unique ATM address by default.

29 Claims, 1 Drawing Sheet

U.S. PATENT DOCUMENTS

| | | | | |
|---|---|---|---|---|
| 4,979,118 | A | 12/1990 | Kheradpir | 364/436 |
| 5,033,595 | A | 7/1991 | Pardee | |
| 5,034,919 | A * | 7/1991 | Sasai et al. | |
| 5,115,495 | A | 5/1992 | Tsuchiya et al. | |
| 5,119,367 | A | 6/1992 | Kawakatsu et al. | |
| 5,128,926 | A | 7/1992 | Perlman et al. | |
| 5,189,662 | A | 2/1993 | Kleine-Altekamp | |
| 5,208,811 | A | 5/1993 | Kashio et al. | |
| 5,233,604 | A | 8/1993 | Ahmadi et al. | |
| 5,253,251 | A | 10/1993 | Aramaki | |
| 5,253,489 | A | 10/1993 | Yoshii | |
| 5,309,437 | A | 5/1994 | Perlman et al. | 730/85.13 |
| 5,331,637 | A | 7/1994 | Francis et al. | |
| 5,361,256 | A | 11/1994 | Doeringer et al. | |
| 5,430,729 | A | 7/1995 | Rahnema | |
| 5,452,294 | A | 9/1995 | Natarajan | |
| 5,477,541 | A * | 12/1995 | White et al. | |
| 5,485,455 | A | 1/1996 | Dobbins et al. | |
| 5,490,140 | A | 2/1996 | Abensour et al. | |
| 5,497,368 | A | 3/1996 | Reijnierse et al. | |
| 5,504,747 | A | 4/1996 | Sweazey | |
| 5,517,494 | A | 5/1996 | Green | |
| 5,517,617 | A * | 5/1996 | Sathaye et al. | 370/395 |
| 5,519,858 | A | 5/1996 | Walton et al. | 395/600 |
| 5,539,734 | A | 7/1996 | Burwell et al. | |
| 5,541,911 | A | 7/1996 | Nilakantan et al. | |
| 5,555,244 | A | 9/1996 | Gupta et al. | |
| 5,571,617 | A | 11/1996 | Cooprider et al. | |
| 5,600,798 | A | 2/1997 | Cherukuri et al. | |
| 5,602,770 | A * | 2/1997 | Ohira | |
| 5,604,868 | A | 2/1997 | Komine et al. | |
| 5,608,726 | A | 3/1997 | Virgile | |
| 5,631,908 | A | 5/1997 | Saxe | |
| 5,632,021 | A | 5/1997 | Jennings et al. | |
| 5,634,010 | A | 5/1997 | Ciscon et al. | |
| 5,638,359 | A | 6/1997 | Peltola et al. | |
| 5,644,718 | A | 7/1997 | Belove et al. | |
| 5,659,684 | A | 8/1997 | Giovannoni et al. | |
| 5,666,353 | A | 9/1997 | Klausmeier et al. | |
| 5,673,265 | A | 9/1997 | Gupta et al. | |
| 5,678,006 | A | 10/1997 | Valizadeh et al. | |
| 5,680,116 | A | 10/1997 | Hashimoto et al. | |
| 5,684,797 | A | 11/1997 | Aznar et al. | 370/390 |
| 5,687,324 | A | 11/1997 | Green et al. | |
| 5,689,506 | A | 11/1997 | Chiussi et al. | 370/388 |
| 5,694,390 | A | 12/1997 | Yamato et al. | |
| 5,724,351 | A | 3/1998 | Chao et al. | |
| 5,740,097 | A * | 4/1998 | Satoh | |
| 5,748,617 | A | 5/1998 | McLain, Jr. | |
| 5,754,547 | A | 5/1998 | Nakazawa | |
| 5,761,192 | A * | 6/1998 | Hummel | 370/395 |
| 5,796,736 | A * | 8/1998 | Suzuki | 370/395 |
| 5,802,054 | A | 9/1998 | Bellenger | |
| 5,835,710 | A * | 11/1998 | Nagami et al. | |
| 5,841,874 | A * | 11/1998 | Kempke et al. | |
| 5,854,903 | A | 12/1998 | Morrison et al. | |
| 5,856,981 | A | 1/1999 | Voelker | |
| 5,892,924 | A | 4/1999 | Lyon et al. | 395/200.75 |
| 5,898,686 | A | 4/1999 | Virgile | |
| 5,903,559 | A | 5/1999 | Acharya et al. | |
| 5,940,396 | A * | 8/1999 | Rochberger | 370/408 |
| 6,122,272 | A | 9/2000 | Tomaszewski et al. | |
| 6,167,030 | A | 12/2000 | Kilkki et al. | |
| 6,356,530 | B1 | 3/2002 | Tomaszewski et al. | |
| 6,611,496 | B1 | 8/2003 | Tomaszewski et al. | |

* cited by examiner

FORMAT FOR AUTOMATIC GENERATION OF UNIQUE ATM ADDRESSES USED FOR PNNI

BACKGROUND OF THE INVENTION

1. Field of the Invention

The invention relates to a format for automatic generation of unique ATM addresses used for PNNI.

2. Related Art

In known ATM systems, each node performing the PNNI protocol must be assigned a unique 20-byte ATM address in a standard format specified by the ATM Forum User-Network Interface Specification (Presently version 3.1). The "PNNI protocol" refers to the protocol specified by the ATM Forum Private Network-Network Interface Specification (presently version 1.0).

One technique for assigning unique addresses for nodes in an ATM network is to assign them manually, thus assuring that each address is unique and also that the nodes form peer groups as desired by the operator configuring the ATM network. However, this technique can be tedious, particularly for ATM networks which include a relatively large number of nodes.

Accordingly, it would be advantageous to provide a method and system for assigning ATM addresses automatically, which by default causes similar devices (such as those from the same manufacturer) to be configured in the same peer group for PNNI protocol purposes. This advantage is achieved in an embodiment of the invention in which a first portion of an ATM address is set to a value unique to the manufacturer (or otherwise unique to a selected class of devices), while a second portion of the ATM address is set to a value unique to the specific device.

SUMMARY OF INVENTION

The invention provides a method and system for providing unique ATM End System Addresses, in which each new device is assigned a unique address in an ATM network while allowing all new devices performing the PNNI protocol in a selected set (such as all those from a single manufacturer) to be assigned by default to the same peer group. In the invention, a first portion of the ATM address (from which the default peer group ID is determined) is by default configured to equal a selected value unique to the manufacturer (or another selected class of devices), which, assures that all devices from the same manufacturer (or in that selected class) are by default configured in the same peer group for PNNI protocol purposes, while a second portion of the ATM address (comprising a switch number ID) and a third portion of the ATM address (comprising a device number ID) are by default both configured to equal a unique value for the device (such as a MAC address), which assures that each device is configured with a unique ATM address. In alternative embodiments, the third portion of the ATM address may be determined using a different method, so long as selection of the third portion causes each device to be assigned a unique ATM address by default.

DETAILED DESCRIPTION OF THE PREFERRED EMBODIMENT

Figure 1:
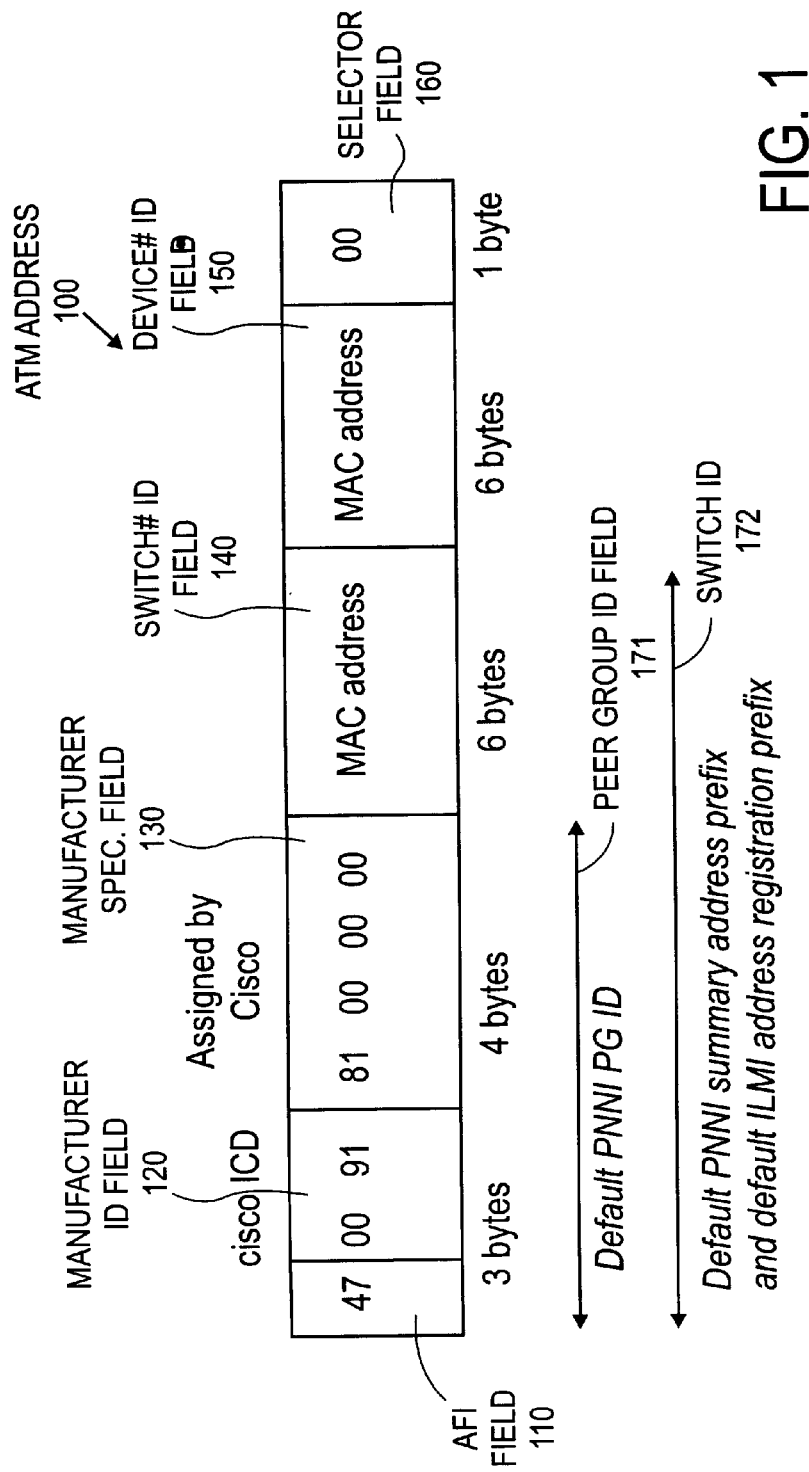
FIG. 1 shows a data structure diagram of an autoconfigured address in an ATM network.

In the following description, a preferred embodiment of the invention is described with regard to preferred process steps and data structures. Those skilled in the art would recognize after perusal of this application that embodiments of the invention can be implemented using general purpose switching processors or special purpose switching processors or other circuits adapted to particular process steps and data structures described herein, and that implementation of the process steps and data structures described herein would not require undue experimentation or further invention.

Inventions described herein can be used in conjunction with inventions described in the following applications:

Application Ser. No. 08/862,915, filed May 23, 1997, Express Mail Mailing No. EM302071674US, in the same inventors, titled "Next Hop Selection In ATM Networks, and Application Ser. No. 08/863,031, filed May 23, 1997, Express Mail Mailing No. EM302071665US, in the same of the same inventor(s), titled "Call size Feedback on PNNI Operation".

Autoconfigured ATM Address

FIG. 1 shows a data structure diagram of an autoconfigured address in an ATM network.

An autoconfigured ATM address 100 comprises a 20-byte AIM address value, including an API field 110, a manufacturer ID field 120, a manufacturer-specific field 130, a switch number ID field 140, a device number ID field 150, and a selector field 160. The ATM address 100 is an ATM End System Address as defined in Section 5.1.3.1 of the ATM Forum User-Network Interface Specification (version 3.1)".

The AFI field 110 comprises a single byte (each byte comprises one octet) and has the value hexadecimal 47. This value indicates that ATM addresses are assigned in conformity with the ICD (International Code Designator) format. In alternative embodiments, ATM addresses may be assigned in conformity with other formats, such as the DCC (Data Country Code) or E.164 formats.

The manufacturer ID field 120 comprises two bytes and has a value which is specific to a manufacturer of the specific device, as specified by the ATM address authority associated with the selected value on the AFI field 110; for the ICD format that authority is the British Standards Institute. In a preferred embodiment, the value hexadecimal 00 91 is reserved for products manufactured by Cisco Systems, Inc. of San Jose, Calif. There is no special significance to this specific value; it is simply the value which is assigned to the manufacturer by the ATM address authority associated with the value hexadecimal 47 in the AFI field 110.

The manufacturer-specific field 130 comprises four bytes and has a value assigned by the manufacturer. In a preferred embodiment, when the manufacturer is Cisco Systems, Inc., of San Jose, Calif., this value is uniformly selected to be hexadecimal 81 00 00 00. There is no special significance to the special value, which could be any selected value so long as maintained consistent across devices manufactured by the same manufacturer.

Collectively, the first seven bytes of the ATM address 100 (the AFI field 110, the manufacturer ID field 120, and the manufacturer-specific field 130) comprise a peer group ID field 171 used in PNNI protocols for ATM routing. This peer group ID field 171 is only seven bytes, not the 14 bytes which are used for PNNI routing in known ATM networks to determine the default peer group ID. The level value is set accordingly to 56 bits to indicate only a seven byte peer group ID field 171. Those devices which have the same value in the peer group ID field 171 are treated as members of the same peer group for PNNI protocol purposes. Because those devices manufactured by the same manufacturer have the same value in the peer group ID field 171, they are thus configured by default all in the same peer group for protocol purposes.

In alternative embodiments, a single manufacturer may provide devices which are autoconfigured to have differing values for the manufacturer-specific field 130, such as for example hexadecimal 81 00 00 00 for a first set of devices and hexadecimal 81 00 00 01 for a second set of devices. The first set of devices would thus be configured by default in a first peer group, while the second set of devices would thus be configured by default in a second peer group distinct from the first peer group. There is no special significance to these specific values, which could be any selected values so long as maintained consistent across sets of devices manufactured by the same manufacturer.

The switch number ID field 140 comprises six bytes and has a value equal to a MAC address for the device. In alternative embodiments, the switch number ID field 140 may be configured to equal a different unique value for the device.

Although in a preferred embodiment, a switch is typically a single device, a switch may also comprise a plurality of devices comprising a switching system, such as a set of one or more physical devices acting together as a single PNNI network management entity. A switching system generally includes one or more lowest-level nodes and, when acting as a PGL (peer group leader) in the PNNI protocol, also includes one or more LGNs (logical group node). A switching system can include a plurality of lowest-level PNNI nodes, and in such cases, each node could have a different ATM address.

Collectively, the first 13 bytes of the ATM address 100 (the AFI field 110, the manufacturer ID field 120, the manufacturer-specific field 130, and the switch number ID field 140) comprise a switch ID 172 used in PNNI protocols for ATM routing. Because the MAC address (or other selected unique value) for the device is unique, the switch ID 172 is therefore unique to the switch. An end system which is coupled to the device, and thus to the ATM network, uses the switch ID 172 supplied by the switch, together with a unique ESI (End System Identifier) assigned to the end system, plus a selector byte, to determine a unique ATM address for the end system.

The device number ID field 150 comprises six bytes and also has a value equal to a MAC address for the device. In alternative embodiments, the device number ID field 150 may be configured to equal a different unique value for the device. Because the MAC address (or other selected unique value) for the device is unique, the ATM address 100 is therefore unique to the device.

The selector field 160 comprises one byte and has the value hexadecimal 00. There is no special significance to this specific value, which could be any selected value.

When the device is coupled to an ATM network, the ATM address 100 is autoconfigured to the values shown herein. The ATM address 100 can be modified by an operator to take on a different value if the autoconfigured value is not advantageous.

Alternative Embodiments

Although preferred embodiments are disclosed herein, many variations are possible which remain within the concept, scope, and spirit of the invention, and these variations would become clear to those skilled in the art after perusal of this application.

What is claimed is:

1. A method, comprising:
configuring an ATM address for a device coupled to an ATM network, including: selecting said ATM address to include
a first portion of the ATM address, the first portion including a) an authority and format identifier, b) a manufacturer identification value, specific to a manufacturer of the device, c) a manufacturer-specific value, assigned by a manufacturer of the device and maintained consistent across a class of devices manufactured by a same manufacturer, whereby devices from the same manufacturer are by default configured in a same PNNI protocol peer group; and
a second portion of the ATM address comprising a switch number identification value unique to the device; and
determining a default peer group ID in response to said first portion, wherein devices from said class are by default configured in the same PNNI protocol peer group.

2. A method as in claim 1, wherein said method of configuring is applied to said device upon coupling said device to an ATM network.

3. A method as in claim 1, wherein said first portion comprises a seven-byte field.

4. A method as in claim 2, wherein said second portion comprises a six-byte field.

5. A method as in claim 4, wherein said six-byte field includes a MAC address for said device.

6. A method as in claim 1, wherein said step of selecting said ATM address further includes selecting a third portion of the ATM address, the third portion comprising a device number ID selected to equal a unique value for the device; whereby a combination of said first portion, said second portion and said third portion is unique to said device.

7. A method as in claim 6, wherein said unique value comprises a MAC address for said device.

8. A method, comprising:
assigning a private network-network interface (PNNI) peer group identification to a device to be coupled with an asynchronous transfer mode (ATM) network based on a manufacturer of the device and a product group to which the device belongs; and
auto-configuring the device at a point of manufacture with an ATM address using the assigned PNNI peer group identification, the ATM address including a first portion having an authority, and format identifier, a manufacturer identification value, specific to a manufacturer of the device, a manufacturer-specific value, and a second portion having a switch number identification value unique to the device, wherein the manufacturer-specific value is assigned by a manufacturer of the device and maintained consistent across a class of devices manufactured by a same manufacturer, whereby devices from the same manufacturer are by default configured in a same PNNI protocol peer group.

9. A method as in claim 8, wherein said first portion comprises a seven-byte field.

10. A method as in claim 8, wherein said second portion comprises a six-byte field.

11. A method as in claim 8, wherein said six-byte field includes a MAC address for said device.

12. A method as in claim 8, wherein the ATM address further includes a third portion having a device number ID selected to equal a unique value for the device; whereby a combination of said first portion, said second portion and said third portion is unique to said device.

13. An article of manufacture comprising:
a machine-accessible medium having associated data, wherein the data, when accessed, results in a machine performing a method comprising:
configuring an ATM address for a device coupled to an ATM network, including: selecting said ATM address to include a first portion of the ATM address, the first portion including a) an authority and format identifier, b) a manufacturer identification value, specific to a manufacturer of the device, c) a manufacturer-specific value, assigned by a manufacturer of the device and maintained consistent across a class of devices manufactured by a same manufacturer, whereby devices from the same manufacturer are by default configured in a same PNNI protocol peer group; and a second portion of the ATM address comprising a switch number identification value unique to the device; and determining a default peer group ID in response to said first portion, wherein devices from said class are by default configured in the same PNNI protocol peer group.

14. An article of manufacture as in claim 13, wherein said method of configuring is applied to said device upon coupling said device to an ATM network.

15. An article of manufacture as in claim 13, wherein said first portion comprises a seven-byte field.

16. An article of manufacture as in claim 13, wherein said second portion comprises a six-byte field.

17. An article of manufacture as in claim 13, wherein said six-byte field includes a MAC address for said device.

18. An article of manufacture as in claim 13, wherein said step of selecting said ATM address further includes selecting a third portion of the ATM address, the third portion comprising a device number ID selected to equal a unique value for the device; whereby a combination of said first portion, said second portion and said third portion is unique to said device.

19. An article of manufacture as in claim 18, wherein said unique value comprises a MAC address for said device.

20. An article of manufacture comprising:

a machine-accessible medium having associated data, wherein the data, when accessed, results in a machine performing a method comprising:

assigning a private network-network interface (PNNI) peer group identification to a device to be coupled with an asynchronous transfer mode (ATM) network based on a manufacturer of the device and a product group to which the device belongs; and auto-configuring the device at a point of manufacture with an ATM address using the assigned PNNI peer group identification, the ATM address including a first portion having an authority and format identifier, a manufacturer identification value, specific to a manufacturer of the device, a manufacturer-specific value, and a second portion having a switch number identification value unique to the device, wherein the manufacturer-specific value is assigned by a manufacturer of the device and maintained consistent across a class of devices manufactured by a same manufacturer, whereby devices from the same manufacturer are by default configured in a same PNNI protocol peer group.

21. A article of manufacture as in claim 20, wherein said first portion comprises a seven-byte field.

22. A article of manufacture as in claim 20, wherein said second portion comprises a six-byte field.

23. A article of manufacture as in claim 20, wherein said six-byte field includes a MAC address for said device.

24. A article of manufacture as in claim 20, wherein the ATM address further includes a third portion having a device number ID selected to equal a unique value for the device; whereby a combination of said first portion, said second portion and said third portion is unique to said device.

25. A device, comprising:

an asynchronous transfer mode (ATM) communications component to communicate on an ATM network;

a memory storage component to store an ATM address, the ATM address including a first portion having an authority and format identifier, a manufacturer identification value, specific to a manufacturer of the device, a manufacturer-specific value, and a second portion having a switch number identification value unique to the device, wherein the manufacturer specific value is assigned by a manufacturer of the device and maintained consistent across a class of devices manufactured by a same manufacturer, whereby devices from the same manufacturer are by default configured in a same PNNI protocol peer group; and an interface to allow the manufacturer of the device to input the ATM address into the memory storage component at a point of manufacture automatically.

26. A device as in claim 25, wherein said first portion comprises a seven-byte field.

27. A device as in claim 25, wherein said second portion comprises a six-byte field.

28. A device as in claim 25, wherein said six-byte field includes a MAC address for said device.

29. A device as in claim 25, wherein the ATM address further includes a third portion having a device number ID selected to equal a unique value for the device; whereby a combination of said first portion, said second portion and said third portion is unique to said device.

* * * * *